United States Patent
Kim (10) Patent No.: US 10,431,379 B2
(45) Date of Patent: *Oct. 1, 2019

(54) METHOD OF MANUFACTURING A MULTILAYER CERAMIC CAPACITOR

(71) Applicant: SAMSUNG ELECTRO-MECHANICS CO., LTD., Suwon-si, Gyeonggi-do (KR)

(72) Inventor: Hyung Joon Kim, Gyunggi-do (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 232 days.

This patent is subject to a terminal disclaimer.

(21) Appl. No.: 15/482,297

(22) Filed: Apr. 7, 2017

(65) Prior Publication Data

US 2017/0213645 A1    Jul. 27, 2017

Related U.S. Application Data

(60) Continuation of application No. 14/206,898, filed on Mar. 12, 2014, now Pat. No. 9,779,873, which is a
(Continued)

(30) Foreign Application Priority Data

Mar. 9, 2011    (KR) .................... 10-2011-0021079

(51) Int. Cl.
*H01G 4/12*    (2006.01)
*H01G 4/005*    (2006.01)
(Continued)

(52) U.S. Cl.
CPC .............. *H01G 4/12* (2013.01); *H01G 4/005* (2013.01); *H01G 4/012* (2013.01); *H01G 4/248* (2013.01); *H01G 4/30* (2013.01); *Y10T 29/435* (2015.01)

(58) Field of Classification Search
CPC .......... H01G 4/005; H01G 4/012; H01G 4/12; H01G 4/248; H01G 4/30; Y10T 29/435
See application file for complete search history.

(56) References Cited

U.S. PATENT DOCUMENTS

| | | |
|---|---|---|
| 4,471,406 A | 9/1984 | Sawairi |
| 4,771,520 A | 9/1988 | Tanaka et al. |

(Continued)

FOREIGN PATENT DOCUMENTS

| | | |
|---|---|---|
| CN | 1397965 A | 2/2003 |
| JP | 60-96813 U | 7/1985 |

(Continued)

OTHER PUBLICATIONS

Japanese Office Action with English translation thereof, issued in Japanese Patent Application No. JP 2011-243181 dated Oct. 16, 2012.

(Continued)

*Primary Examiner* — Minh N Trinh
(74) *Attorney, Agent, or Firm* — Morgan, Lewis & Bockius LLP (57) ABSTRACT

There are provide a method of manufacturing a multilayer ceramic comprising: preparing a first ceramic green sheet on which a plurality of stripe-type first inner electrode patterns are formed to be spaced apart from one another; forming a ceramic green sheet laminate by alternately stacking the first ceramic green sheet and the second ceramic green sheet; forming first and second groove portions on at least one of the top surface and a bottom surface of the ceramic green sheet laminate; and cutting the ceramic green sheet laminate.

10 Claims, 6 Drawing Sheets

Related U.S. Application Data division of application No. 13/285,940, filed on Oct. 31, 2011, now Pat. No. 9,196,422.

(51) Int. Cl.
*H01G 4/30* (2006.01)
*H01G 4/012* (2006.01)
*H01G 4/248* (2006.01)

(56) References Cited

U.S. PATENT DOCUMENTS

| | | | |
|---|---|---|---|
| 5,295,289 A | 3/1994 | Inagaki et al. | |
| 5,488,765 A | 2/1996 | Kubota et al. | |
| 7,050,288 B2 | 5/2006 | Ahiko et al. | |
| 8,004,820 B2 | 8/2011 | Itamura | |
| 8,570,709 B2 | 10/2013 | Itamura | |
| 9,196,422 B2 * | 11/2015 | Kim | H01G 4/005 |
| 9,779,873 B2 * | 10/2017 | Kim | H01G 4/005 |
| 2001/0006449 A1 | 7/2001 | Chazono | |
| 2003/0008182 A1 | 1/2003 | Saitoh et al. | |
| 2003/0011963 A1 | 1/2003 | Ahiko et al. | |
| 2004/0125539 A1 | 7/2004 | Murakami et al. | |
| 2004/0226647 A1 | 11/2004 | Ito et al. | |
| 2009/0310278 A1 | 12/2009 | Tani | |
| 2013/0294010 A1 | 11/2013 | Lee et al. | |
| 2015/0302989 A1 * | 10/2015 | Choi | H01G 2/14 29/25.03 |

FOREIGN PATENT DOCUMENTS

| | | |
|---|---|---|
| JP | 61-183913 A | 8/1986 |
| JP | 64-073709 A | 3/1989 |
| JP | 02-38722 U | 3/1990 |
| JP | 04-278507 A | 10/1992 |
| JP | 08-45777 A | 2/1996 |
| JP | 08-279437 A | 10/1996 |
| JP | 09-190946 A | 7/1997 |
| JP | 09-190947 A | 7/1997 |
| JP | 2002-305127 A | 10/2002 |
| JP | 2005-101038 A | 4/2005 |
| JP | 2005-197530 A | 7/2005 |
| JP | 2005-216955 A | 8/2005 |
| JP | 2005-259772 A | 9/2005 |
| JP | 2005-303160 A | 10/2005 |
| JP | 2007-067026 A | 3/2007 |
| JP | 2010-021523 A | 1/2010 |
| JP | 2010-093037 A | 4/2010 |
| JP | 2010-093038 A | 4/2010 |
| JP | 2011-003846 A | 1/2011 |

OTHER PUBLICATIONS

Office Action with Restriction Requirement U.S. Appl. No. 13/285,940 dated Oct. 3, 2013.
Office Action U.S. Appl. No. 13/285,940 dated Nov. 21, 2013.
Office Action issued in Japanese Patent Application No. 2011-243181 dated Apr. 9, 2013.
U.S. Office Action issued in U.S. Appl. No. 13/285,940, dated Mar. 10, 2014.
Japanese Office Action, w/ English translation thereof, issued in Japanese Patent Application No. JP 2013-166240 dated Feb. 25, 2014.
Chinese Office Action issued in Chinese Application No. 201110390597.1 dated Apr. 3, 2014, w/English translation.
United States Office Action issued in U.S. Appl. No. 13/285,940 dated Oct. 2, 2014.
Chinese Office Action dated Feb. 10, 2015 issued in Chinese Patent Application No. 201110390597.1 (English translation).
United States Final Office Action issued in U.S. Appl. No. 13/285,940 dated Mar. 10, 2015.
Non-Final Office Action dated Jan. 25, 2016, issued in U.S. Appl. No. 14/206,898.
Final Office Action dated Jun. 24, 2016, issued in U.S. Appl. No. 14/206,898.
Non-Final Office Action dated Jan. 9, 2017, issued in U.S. Appl. No. 14/206,898.

\* cited by examiner

METHOD OF MANUFACTURING A MULTILAYER CERAMIC CAPACITOR

CROSS-REFERENCE TO RELATED APPLICATIONS

This application is a Continuation Application of U.S. Ser. No. 14/206,898 filed Mar. 12, 2014, now U.S. Pat. No. 9,779,983, which is a Divisional Application of U.S. Ser. No. 13/285,940 filed Oct. 31, 2011, now U.S. Pat. No. 9,196,422, which claims the priority of Korean Patent Application No. 10-2011-0021079 filed on Mar. 9, 2011, in the Korean Intellectual Property Office, the disclosures of which are incorporated herein by reference in their entireties.

BACKGROUND OF THE INVENTION

Field of the Invention

The present invention relates to a multilayer ceramic capacitor and a method of manufacturing the same, and more particularly, to a high-capacity multilayer ceramic capacitor having excellent reliability and a method of manufacturing the same.

Description of the Related Art

Generally, electronic components using a ceramic material such as a capacitor, an inductor, a piezoelectric element, a varistor, a thermistor, or the like, include a ceramic body made of a ceramic material, inner electrodes formed within the ceramic body, and outer electrodes mounted on surfaces of the ceramic body so as to be connected to the inner electrodes.

The multilayer ceramic capacitor, among ceramic electronic components, is configured to include a plurality of stacked dielectric layers, inner electrodes disposed to be opposed to each other, having each dielectric layer therebetween, and outer electrodes electrically connected to the inner electrodes.

The multilayer ceramic capacitor has been widely used as a component of a mobile communication apparatus such as a computer, a PDA, a mobile phone, or the like, due to advantages such as miniaturization, high capacity, ease of mounting, and the like.

Recently, as electronic products have become miniaturized and multi-functional, chip parts have also tended to be miniaturized and multi-functional. As a result, there is a need to miniaturize the multilayer ceramic capacitor while increasing the capacity thereof.

Generally, the multilayer ceramic capacitor may be manufactured as follows. First, an inner electrode is formed by manufacturing a ceramic green sheet and printing a conductive paste on the ceramic green sheet. A green ceramic laminate is manufactured by multilayering the ceramic green sheets, on which the inner electrodes are formed, from several layers to several hundred layers. Thereafter, the solid green ceramic laminate is manufactured by compressing the green ceramic laminate at high temperature and high pressure and the solid green ceramic laminate is subjected to a cutting process to manufacture green chips. Thereafter, the multilayer ceramic capacitor is completed by plasticizing and firing the green chip and then, forming the outer electrodes thereon.

Recently, as the multilayer ceramic capacitor has been miniaturized and the capacity thereof increased, the ceramic laminate has also been thinned and multilayered. As the ceramic green sheet is thinned and multilayered, a difference in thickness between a ceramic green sheet layer on which the inner electrodes are formed and another ceramic green sheet layer on which the inner electrodes are not formed occurs, and a difference in density therebetween occurs after compressing the ceramic green sheet layers.

Internal structure defects such as cracks, pores and the like may occur in the ceramic body due to differences in thickness and density.

SUMMARY OF THE INVENTION

An object of the present invention provides a high-capacity multilayer ceramic capacitor having excellent reliability and a method of manufacturing the same.

According to an exemplary embodiment of the present invention, there is provided a multilayer ceramic capacitor, including: a multilayer body having a first side and a second side opposed to each other and having a third side and a fourth side connecting the first side to the second side; inner electrodes formed in the multilayer body and formed to be spaced apart from the third side or the fourth side by a predetermined distance; groove portions formed on at least one of top and bottom surfaces of the multilayer body and formed parallel to the third or fourth side by a predetermined distance from the third side or the fourth side; and outer electrodes extended from the third side and the fourth side to the top surface or the bottom surface of the multilayer body to cover the groove portions.

The multilayer ceramic capacitor may further include first and second side portions formed on the first side and the second side of the multilayer body.

The first and second side portions may be formed on at least one of the top and bottom surfaces and may include the groove portions formed parallel to the third or fourth side of the multilayer body.

The groove portions may have a V-shape.

The first side portion and the second side portion may be made of ceramic slurry.

The multilayer ceramic capacitor may further include a dummy electrode having a predetermined distance from the inner electrodes and formed within a predetermined distance between the inner electrodes and the third side or the fourth side.

The dummy electrode may have one end exposed to the third side or the fourth side.

The multilayer body may be formed by stacking a plurality of dielectric layers having a width forming a distance between the first and second sides, and the inner electrodes may have a width the same as the width of the dielectric layer.

The multilayer ceramic capacitor may further include a dummy electrode formed on the dielectric layer to be spaced apart from the inner electrodes by a predetermined distance and having a width the same as the width of the dielectric layer.

The inner electrodes may include a first inner electrode of which one end is exposed to the third side and the other end is formed to be spaced apart from the fourth side by a predetermined distance and a second inner electrode of which one end is exposed to the fourth side and the other end is formed to be spaced apart from the third side by a predetermined distance.

According to another exemplary embodiment of the present invention, there is provided a method of manufacturing a multilayer ceramic capacitor, including: preparing a first ceramic green sheet on which a plurality of stripe-type first inner electrode patterns are formed to be spaced apart from one another by a predetermined distance and a second ceramic green sheet on which a plurality of stripe-type second inner electrode patterns are formed to be spaced apart from one another by a predetermined distance; forming a ceramic green sheet laminate by alternately stacking the first ceramic green sheet and the second ceramic green sheet in such a manner that a central portion of each of the stripe-type first inner electrode patterns and a predetermined distance between the stripe-type second inner electrode patterns overlap with each other; forming groove portions on at least one of a top surface and a bottom surface of the ceramic green sheet laminate, corresponding to a predetermined distance formed between the stripe-type first inner electrode patterns and a predetermined distance formed between the stripe-type second inner electrode patterns; and cutting the ceramic green sheet laminate.

The forming of the groove portion may be performed by pressing the ceramic green sheet laminate.

The method of manufacturing a multilayer ceramic capacitor may further include forming a first dummy electrode pattern within the predetermined distance formed between the stripe-type first inner electrode patterns or a second dummy electrode pattern within the predetermined distance formed between the stripe-type second inner electrode patterns.

The cutting of the ceramic green sheet laminate may be performed by cutting the ceramic green sheet laminate at a predetermined width such that the ceramic green sheet is cut into bar-type laminates, each bar-type laminate having sides to which the distal edges of first inner electrodes and second inner electrodes are exposed, and groove portions formed in a width direction thereof, and the cutting of the ceramic green sheet laminate further includes forming a first side portion and a second side portion made of ceramic slurry at the sides of the bar-type laminate to which the distal edges of the first inner electrode and the second inner electrode are exposed.

The method of manufacturing a multilayer ceramic capacitor may further include, after the forming of the first and second side portions, cutting the bar-type laminate into multilayer bodies, each multilayer body having a third side and a fourth side to which respective one ends of the first inner electrodes and the second inner electrodes are exposed, by cutting the central portion of each of the first inner electrodes and a predetermined distance between the second inner electrodes along the same cutting line.

The method of manufacturing a multilayer ceramic capacitor may further include forming outer electrodes extending from the third or fourth side of the multilayer body to the top surface or the bottom surface of the multilayer body to cover the groove portions.

The cutting of the ceramic green sheet laminate may be performed by cutting the ceramic green sheet laminate at a predetermined width such that the ceramic green sheet is cut into bar-type laminates, each bar-type laminate having sides to which the distal edges of first inner electrodes and second inner electrodes are exposed, and groove portions formed in a width direction thereof; and cutting the bar-type laminate into multilayer bodies, each multilayer body having a third side and a fourth side to which respective one ends of the first inner electrodes and the second inner electrodes are exposed, by cutting the central portion of each of the first inner electrodes and a predetermined distance between the second inner electrodes along the same cutting line, and the cutting of the ceramic green sheet laminate further includes forming the first and second side portions made of ceramic slurry on the sides of the multilayer body to which the distal edges of the first inner electrodes and the second inner electrodes are exposed.

The method of manufacturing a multilayer ceramic capacitor may further include forming outer electrodes extending from the third or fourth side of the multilayer body to the top surface or the bottom surface of the multilayer body to cover the groove portions.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and sizes of components are exaggerated for clarity. The same or equivalent elements are referred to by the same reference numerals throughout the specification.

Figure 1A:
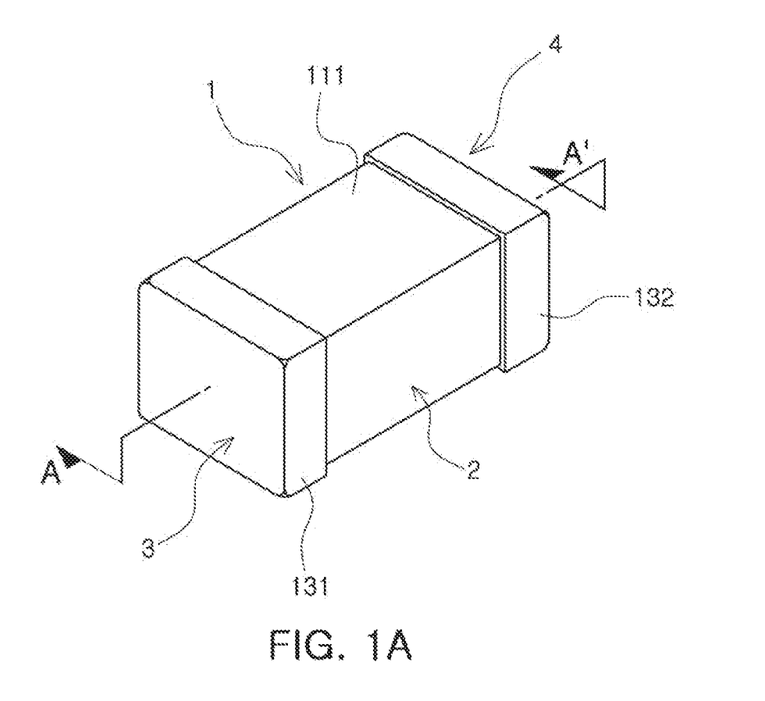
FIG. 1A is a schematic perspective view of a multilayer ceramic capacitor according to an exemplary embodiment of the present invention.
Figure 1B:
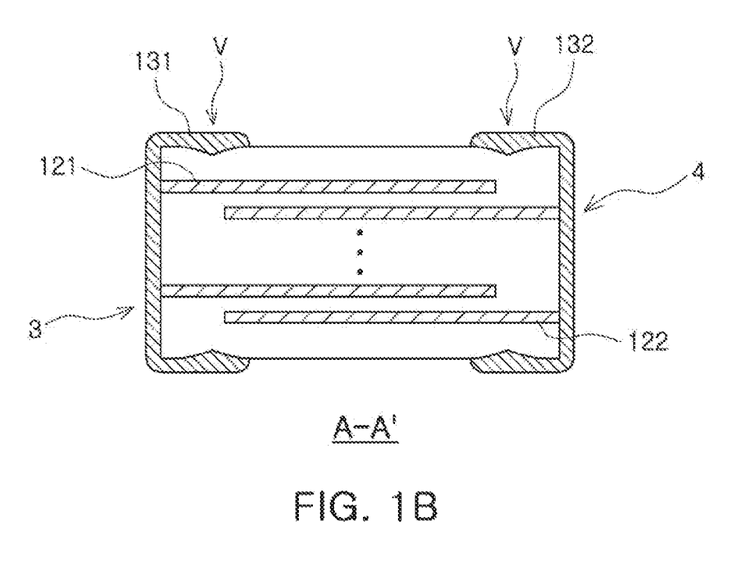
FIG. 1B is a cross-sectional view of the multilayer ceramic capacitor taken along line A-A' of FIG. 1A.

FIG. 1A is a schematic perspective view of a multilayer ceramic capacitor according to an exemplary embodiment of the present invention. FIG. 1B is a cross-sectional view of the multilayer ceramic capacitor taken along line A-A' of FIG. 1A.

Referring to FIGS. 1A and 1B, a multilayer ceramic capacitor according to the exemplary embodiment of the present invention is configured to include a multilayer body 111, a plurality of inner electrodes 121 and 122 formed in the multilayer body, groove portions (V) formed on the top surface and the bottom surface of the multilayer body, and outer electrodes 131 and 132 formed on an outer surface of the multilayer body.

The multilayer body 111 may have a first side 1 and a second side 2 opposed to each other and a third side 3 and a fourth side 4 connecting the first side to the second side.

The shape of the multilayer body 111 is not particularly limited, but may be a rectangular parallelepiped shape having the first to fourth sides as shown.

The respective one ends of the plurality of inner electrodes 121 and 122 formed in the multilayer body 111 are alternately exposed to the third or fourth side and the other ends thereof may be formed to be spaced apart from the third side or the fourth side by a predetermined distance.

In detail, the inner electrodes 121 and 122 may be formed as a pair of a first inner electrode 121 and a second inner electrode 122 having different polarities. One end of the first inner electrode 121 may be exposed to the third side 3 and the other end thereof may be formed to be spaced apart by a predetermined distance from the fourth side 4. One end of the second inner electrode 122 may be exposed to the fourth side 4 and the other end thereof may be formed to be spaced apart from the third side 3 by a predetermined distance.

The top surface and the bottom surface of the multilayer body may be provided with the groove portions V, and the groove portions V may be formed parallel to the third or fourth side of the multilayer body. The groove portion V may be configured to include a first groove portion formed to be spaced apart by a predetermined distance from the fourth side of the multilayer body and a second groove portion formed to be spaced apart from the third side of the multilayer body by a predetermined distance.

In the exemplary embodiment of the present invention, both of the top surface and the bottom surface of the multilayer body may be provided with the groove portions V; however, the present invention is not limited thereto and only one of the top surface and the bottom surface may be provided with the groove portions V.

The third side 3 and the fourth side 4 of the multilayer body may be provided with the first and second outer electrodes 131 and 132 to be electrically connected to the inner electrodes of which respective one ends are exposed to the third side or the fourth side. The outer electrodes 131 and 132 maybe extend from the third side and the fourth side of the multilayer body to the top surface or the bottom surface of the multilayer body to cover the groove portions V. The contact area between the outer electrodes and the multilayer body may be widened by the groove portions V, thereby improving the adhesive strength of the outer electrodes.

FIGS. 2A to 2D are diagrams schematically showing a multilayer ceramic capacitor according to another exemplary embodiment of the present invention. Herein, other components different from the above-mentioned exemplary embodiment may be mainly described and the detailed description of the same components will be omitted.

Figure 2A:
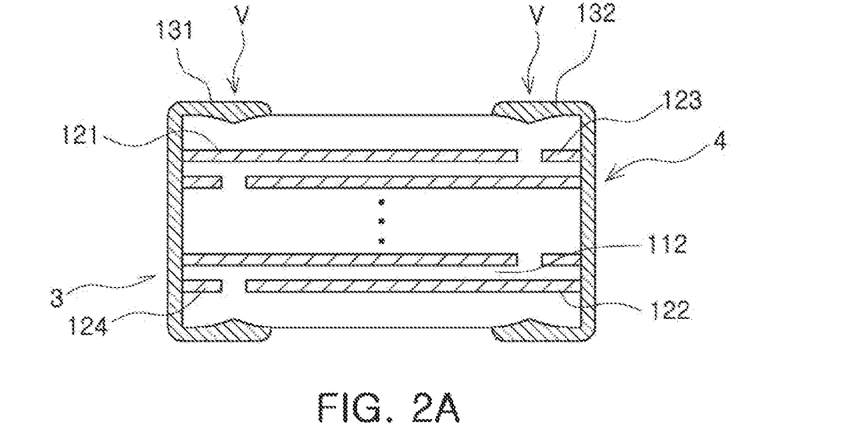
FIG. 2A is a cross-sectional view of a multilayer ceramic capacitor according to an exemplary embodiment of the present invention.
Figure 2B:
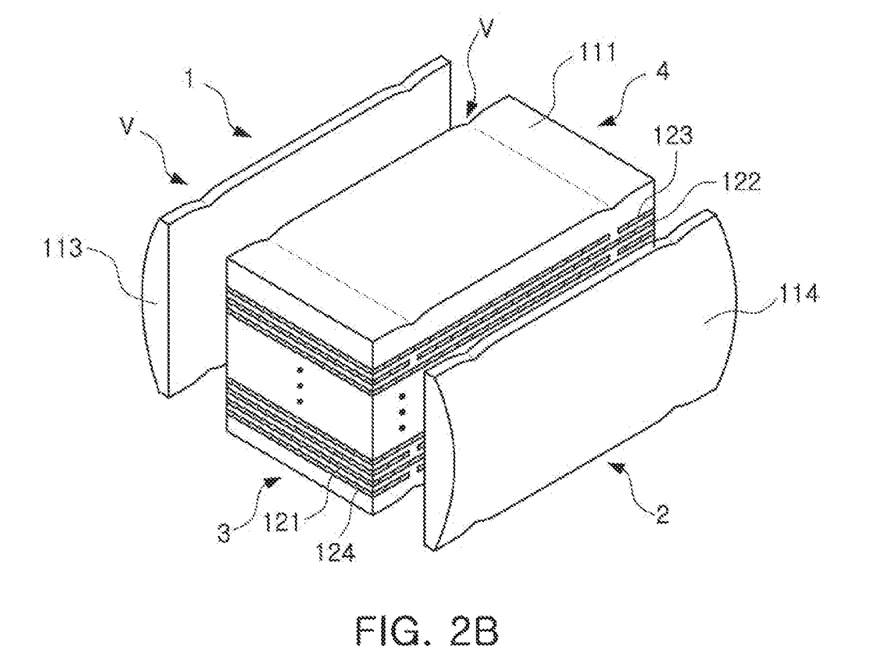
FIG. 2B is an exploded perspective view of a multilayer body and a side portion.
Figure 2C:
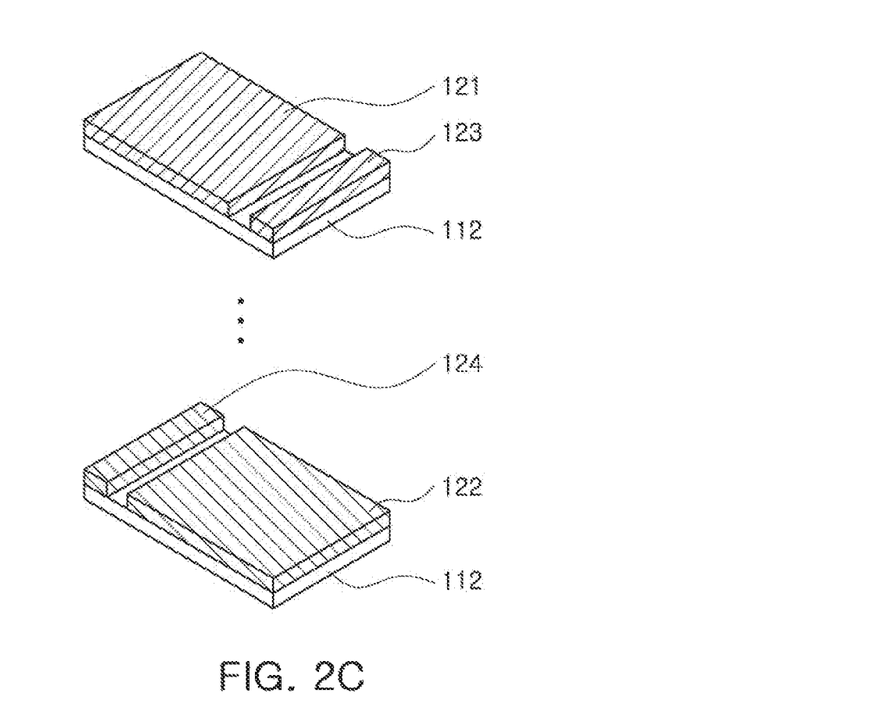
FIG. 2C is an exploded perspective view of the multilayer body.
Figure 2D:
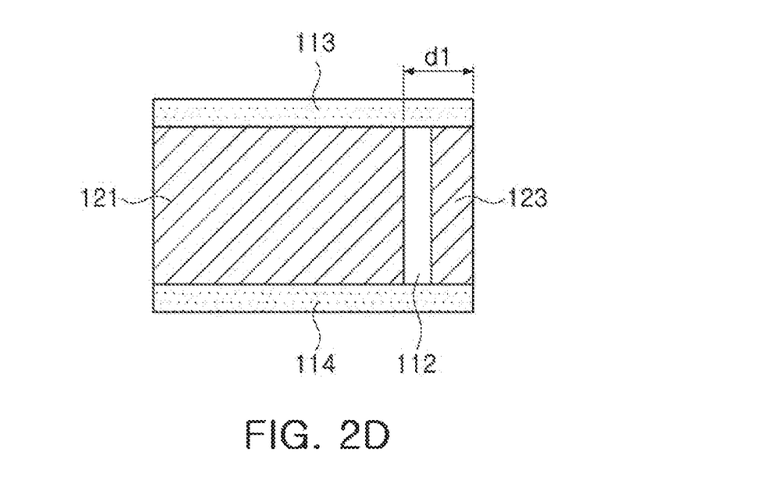
FIG. 2D is a top plan view showing a portion of the multilayer ceramic capacitor.

FIG. 2A is a cross-sectional view of a multilayer ceramic capacitor according to an exemplary embodiment of the present invention. FIG. 2B is an exploded perspective view of a multilayer body and a side portion. FIG. 2C is an exploded perspective view of the multilayer body. FIG. 2D is a top plan view of a portion of the multilayer ceramic capacitor.

Referring to FIGS. 2A through 2D, the multilayer body 111 may have the first side 1 and the second side 2 opposed to each other and the third side 3 and the fourth side 4 connecting the first side to the second side.

In particular, referring to FIGS. 2C and 2D, the multilayer body 111 may be formed by stacking a plurality of dielectric layers 112. The plurality of dielectric layers 112 may be in a sintered state, and may be integrated such that a boundary between adjacent dielectric layers may not be readily apparent.

The inner electrodes 121 and 122 may be formed on the dielectric layer and the inner electrodes 121 and 122 may be formed within the multilayer body 111 by sintering, having each dielectric layer therebetween.

In more detail, the first inner electrode 121 may be formed on one dielectric layer 112 and the second inner electrode 122 may be formed on another dielectric layer 112. The first inner electrode 121 and the second inner electrode 122 are not entirely formed in the longitudinal direction of the dielectric layer. In the exemplary embodiment of the present invention, the length of the dielectric layer may form a distance between the third side and the fourth side of the multilayer body and the width of the dielectric layer may form a distance between the first side and the second side of the multilayer body.

One end of the first inner electrode 121 may be formed up to the third side 3 to be exposed to the third side 3 and the other end of the first inner electrode 121 may be formed to be spaced apart by a predetermined distance d1 from the fourth side 4 of the ceramic body. The one end of the first inner electrode exposed to the third side 3 of the multilayer body may be connected to the first outer electrode 131.

One end of the second inner electrode 122 may be exposed to the fourth side 4 to be connected to the second outer electrode 132 and the other end of the second inner electrode 122 may be formed to be spaced apart from the third side 3 by a predetermined distance.

In addition, the inside of the multilayer body 111 may have dummy electrodes 123 and 124 formed therein to be spaced apart from the inner electrodes 121 and 122 by a predetermined distance. The dummy electrode may refer to an electrode that does not contribute to forming the capacity of the capacitor, even though it is connected to an outer electrode.

The first dummy electrode 123 may be formed to be spaced apart from the first inner electrode 121 by a predetermined distance so as not to be electrically connect the first inner electrode 121 on the dielectric layer 112. The first dummy electrode 123 may be formed within a predetermined position between the first inner electrode 121 and the fourth side and one end of the first dummy electrode 123 may be exposed to the fourth side.

In addition, a second dummy electrode 124 may be formed to be spaced apart by a predetermined distance so as not to electrically connect the second inner electrode 122 on the dielectric layer 112. The second dummy electrode 124 may be formed to be spaced apart by a predetermined distance between the second inner electrode 122 and the third side and one end of the second dummy electrode 124 may be exposed to the third side.

The inner electrodes 121 and 122 or the dummy electrodes 123 and 124 may have a width the same as the width of the dielectric layer 112. That is, the inner electrodes 121 and 122 or the dummy electrodes 123 and 124 may be entirely formed in the width direction of the dielectric layer 112. Therefore, both of the distal edges of the inner electrodes 121 and 122 and the distal edges of the dummy electrodes 123 and 124 may be exposed to the first and second sides of the multilayer body 111.

According to the exemplary embodiment of the present invention, although the inner electrodes and the dielectric layer are thinly formed, the inner electrodes are entirely formed across the width of the dielectric layer to increase the overlapping area between the inner electrodes, thereby increasing the capacity of the multilayer ceramic capacitor.

In addition, the multilayer ceramic capacitor having excellent reliability while having the excellent capacity characteristics may be provided by reducing steps due to the inner electrodes within the multilayer ceramic capacitor so as to improve the lifespan of the insulation resistance. As described above, when the dummy electrode is further formed on the dielectric layer, the steps due to the inner electrodes may be more effectively reduced.

Referring to FIG. 2B, both sides of the multilayer body 111 to which the distal edges of the inner electrodes 121 and 122 are exposed may have the first side portion 113 and the second side portion 114 formed thereon. Therefore, the short of the inner electrodes of which the distal edges are exposed to the first and second sides may be prevented.

The top surface and the bottom surface of the multilayer body 111 may be provided with the groove portions V parallel to the third or fourth side of the multilayer body. The groove portion V may be configured to include a first groove portion formed to be spaced apart from the fourth side of the multilayer body by a predetermined distance and a second groove portion formed to be spaced apart from the third side of the multilayer body by a predetermined distance.

One end of the first inner electrode 121 may be formed to be spaced apart from the fourth side by the predetermined distance and an area in which the inner electrodes are not formed may be present between the first inner electrode 121 and the fourth side. The top surface of the multilayer body corresponding to the area in which the first inner electrode 121 is not present may be provided with the first groove portion.

The first groove portion may have a V shape and the central portion of the V shape may be formed at a position on the top surface and the bottom surface of the multilayer body, the position corresponding to a predetermined distance formed between the first inner electrode 121 and the first dummy electrode 123.

In addition, the central portion of the second groove portion may be formed at a position on the top surface and the bottom surface of the multilayer body, the position corresponding to a predetermined distance formed between the second inner electrode 122 and the second dummy electrode 124.

In addition, the top surface and the bottom surface of the first and second side portions 113 and 114 may be provided with the groove portions V. The groove portions V may be formed in parallel with the third or fourth side of the multilayer body 111. The groove portions V may be formed parallel to the third or fourth side of the multilayer body, similarly to the groove portion V formed on the top surface and the bottom surface of the multilayer body 111.

According to the exemplary embodiment of the present invention, the first side portion 113 and the second side portion 114 may be made of ceramic slurry. The first side portion 113 and the second side portion 114 may be formed to have desired shapes and thicknesses (or, defined as a width) by controlling the amount and shape of the ceramic slurry.

The thickness of the first and second side portions 113 and 114 is not particularly limited, but may be set to be 2 to 30 µm.

When the thickness of the first and second side portions 113 and 114 is less than 2 µm, the moisture resistance characteristics of the multilayer ceramic capacitor may be degraded and radiating cracks may occur at the time of forming the outer electrodes.

In addition, when the thickness between the first and second side portions 113 and 114 exceeds 30 µm, it may be difficult to remove the residual carbon during the plasticizing and firing processes of the multilayer body, thereby degrading the connectivity of the inner electrodes. In addition, the overlapping area between the inner electrodes is relatively reduced, whereby securing the high-capacity multilayer ceramic capacitor may be difficult.

The third side 3 and the fourth side 4 of the multilayer body may have the first and second outer electrodes 131 and 132 so as to be electrically connected to respective one ends of the exposed inner electrodes 121 and 122. The first and second outer electrodes 131 and 132 may extend from the third side and the fourth side of the multilayer body to the top surface or the bottom surface thereof to cover the groove portions V formed on the multilayer body. In addition, in the exemplary embodiment of the present invention, the first and second outer electrodes 131 and 132 may be extended to the groove portions V formed on the first and second side portions 113 and 114.

The contact area between the outer electrodes and the multilayer body may be widened by the groove portions V, thereby improving the adhesive strength of the outer electrodes.

The thickness of the first and second side portions may be small in the exemplary embodiment of the present invention, thereby relatively widening the overlapping area between the inner electrodes formed in the multilayer body. Further, the residual carbon may be easily removed by making the thickness of the first and second side portions small. Therefore, the concentration distribution of the residual carbon is small, thereby maintaining the same fine structure and improving the connectivity of the inner electrodes.

The exemplary embodiment of the present invention improves adhesive strength between the multilayer body and the outer electrodes, thereby improving mechanical strength against the external impact. Further, in the exemplary embodiment of the present invention the multilayer ceramic capacitor may be manufactured to have excellent reliability by improving moisture resistance and insulating resistance characteristics while maximizing the capacity of the multilayer ceramic capacitor.

Hereinafter, a method of manufacturing a multilayer ceramic capacitor according to an exemplary embodiment of the present invention will be described.

FIGS. 3A to 3F are cross-sectional views and perspective views schematically showing a method of manufacturing a multilayer ceramic capacitor according to an exemplary embodiment of the present invention.

Figure 3A:
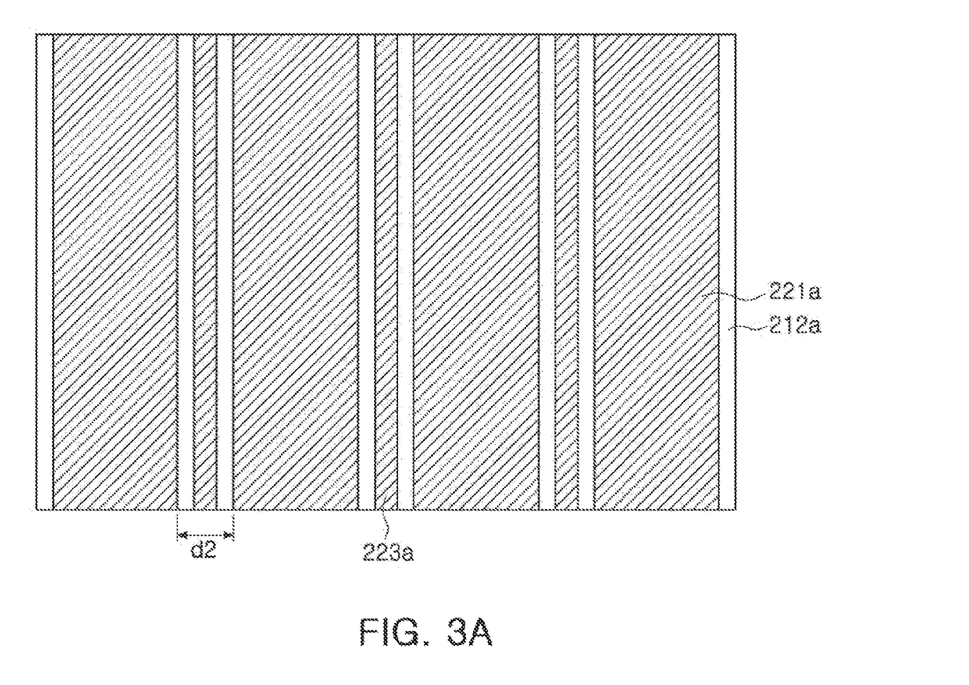
FIGS. 3A to 3F are cross-sectional views and perspective views schematically showing a method of manufacturing a multilayer ceramic capacitor according to an exemplary embodiment of the present invention.

First, as shown in FIG. 3A, a plurality of stripe-type first inner electrode patterns 221a may be formed on a ceramic green sheet 212a to be spaced apart from one another by a predetermined distance d2. The plurality of stripe-type first inner electrode patterns 221a may be formed in parallel with one another.

The predetermined distance d2 is a distance to allow the inner electrodes to be insulated from the outer electrodes having different polarities and may be considered as a distance of d1×2 shown in FIG. 2D.

The ceramic green sheet 212a may be made of ceramic paste including a ceramic powder, an organic solvent, and an organic binder.

The ceramic green sheet 212a may be made of ceramic paste including a ceramic powder, an organic solvent, and an organic binder.

The ceramic powder is a material having high permittivity, but is not limited thereto. A barium titanate ($BaTiO_3$) material, a lead complex Perovskite material, a strontium titanate ($SrTiO_3$) material, or the like, may be used, preferably, a barium titanate ($BaTiO_3$) powder may be used. When the ceramic green sheet 212a having the plurality of stripe-type first inner electrode patterns 221a formed thereon is fired, it may become a dielectric layer 112 constituting the multilayer body 111.

The stripe-type first inner electrode patterns 221a may be made of the inner electrode paste including a conductive metal. The conductive metal is not limited thereto, but may be Ni, Cu, Pd, or an alloy thereof.

A method of forming the stripe-type first inner electrode pattern 221a on the ceramic green sheet 212a is not particularly limited, but may be formed by, for example, a printing method such as a screen printing method or a gravure printing method.

In addition, a first dummy electrode pattern 223a may be formed within a predetermined distance d2 formed between the stripe-type first inner electrode patterns 221a. The first dummy electrode pattern 223a may be formed to be spaced apart from the stripe-type first inner electrode pattern 221a by a predetermined distance for electrical insulation. Therefore, as shown in FIGS. 2A to 2D, the multilayer ceramic capacitor may be manufactured.

Further, the plurality of stripe-type second inner electrode patterns 222a may be formed on another ceramic green sheet 212a to be spaced apart from one another by a predetermined distance. In addition, a second dummy electrode pattern 224a may be formed within a predetermined distance formed between the stripe-type second inner electrode patterns 222a.

Hereinafter, the ceramic green sheet on which the first inner electrode patterns 221a are formed may be referred to as the first ceramic green sheet and the ceramic green sheet on which the second inner electrode patterns 222a are formed may be referred to as the second ceramic green sheet.

Figure 3B:
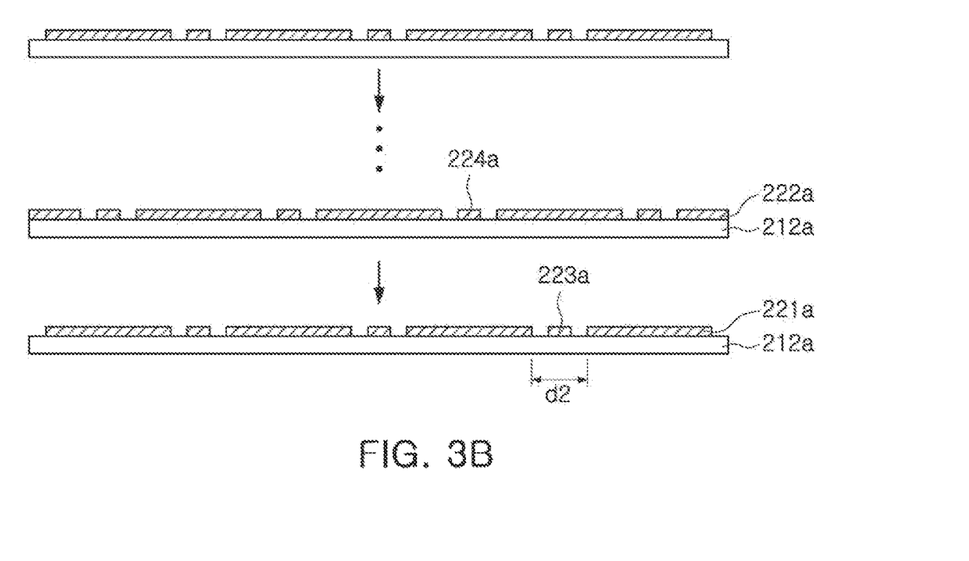

Next, as shown in FIG. 3B, the first and second ceramic green sheets may be alternately stacked such that the stripe-type first inner electrode patterns 221a and the stripe-type second inner electrode patterns 222a are alternately stacked.

Thereafter, the stripe-type first inner electrode pattern 221a may form the first inner electrode 221 and the stripe-type second inner electrode pattern 222a may form the second inner electrode 222. In addition, the first dummy electrode pattern 223a may form the first dummy electrode 223 and the second dummy electrode pattern 224a may form the second dummy electrode 224.

Figure 3C:
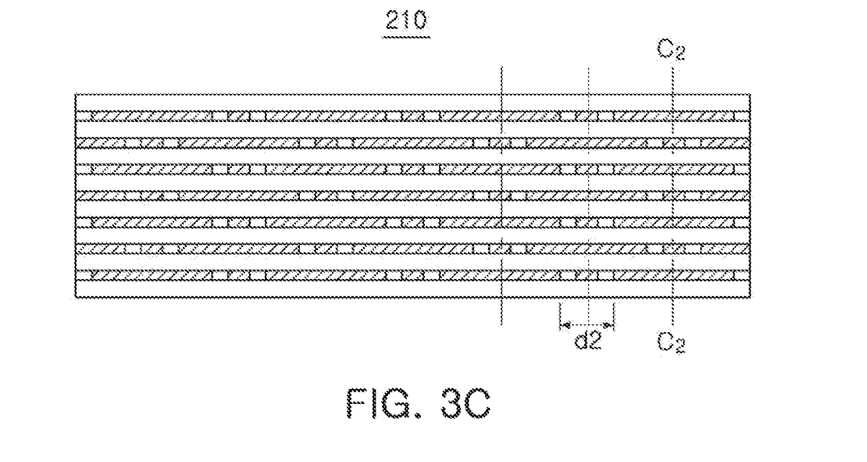
Figure 3D:
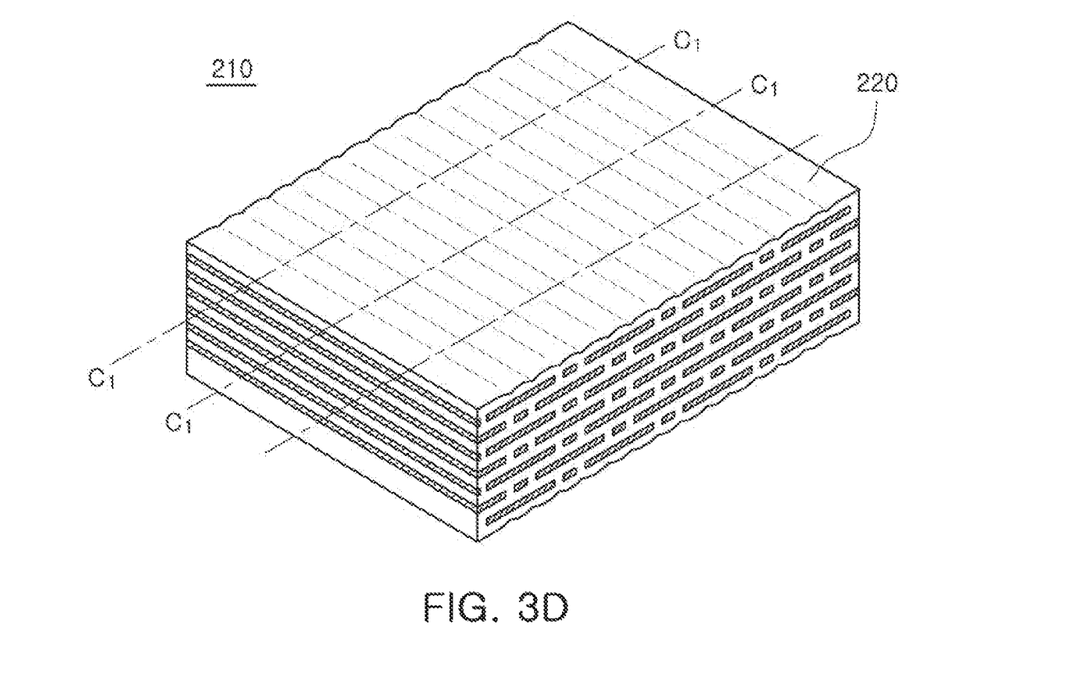

FIG. 3C is a cross-sectional view of a ceramic green sheet laminate 210 on which the first and second ceramic green sheets are stacked according to the exemplary embodiment of the present invention and FIG. 3D is a perspective view of the ceramic green sheet laminate 210 on which the first and second ceramic green sheets are stacked.

Referring to FIGS. 3C and 3D, the first ceramic green sheet on which the plurality of parallel stripe-type first inner electrode patterns 221a are printed and the second ceramic green sheet on which the plurality of parallel stripe-type second inner electrode patterns 222a are printed are alternately stacked.

In more detail, the first ceramic green sheet and the second ceramic green sheet are stacked in such a manner that the central portion of the stripe-type first inner electrode pattern 221a printed on the first ceramic green sheet and the distance d2 between the stripe-type second inner electrode patterns 222a printed on the second ceramic green sheet overlap with each other. The distance d2 between the stripe-type second inner electrode patterns 222a may be formed to have a second dummy electrode pattern therein.

At least one surface of the top and bottom surfaces of the ceramic green sheet laminate 210 may have the groove portions formed thereon. The method of forming the groove portions is not particularly limited and therefore, for example, a method of compressing the ceramic green sheet laminate 210 may be used. The magnitude of pressure applied to the ceramic green sheet laminate may be appropriately selected according to the strength of the ceramic green sheet laminate and the shape of the desired groove portion.

The groove portions may be formed in areas in which steps are caused by the inner electrode and the dummy electrode. The groove portions may be formed on the top surface or the bottom surface of the ceramic green sheet, corresponding to areas in which the inner electrode or the dummy electrode is not present. In more detail, the groove portions may be formed in the positions corresponding to the predetermined distance formed between the stripe-type inner electrode patterns and a predetermined distance formed between the stripe-type inner electrode pattern and the dummy electrode pattern. According to the exemplary embodiment of the present invention, the groove portion may be easily formed according to the length direction of the stripe-type inner electrode pattern.

In an exemplary embodiment of the present invention, two groove portions may be formed between the stripe-type inner electrode patterns. Therefore, the exemplary embodiment of the present invention may improve cutting precision and reduce chip size distribution. A detailed description thereof will be provided below.

Next, as shown in FIG. 3D, the ceramic green sheet laminate 210 may be cut so as to traverse the plurality of stripe-type first inner electrode patterns 221a and the plurality of stripe-type second inner electrode patterns 222a. That is, the ceramic green sheet laminate 210 may be cut into bar-type laminates 220 along cutting line C1-C1. In this case, the stacked ceramic green sheet and the dummy electrode pattern is also cut together with the stripe-type inner electrode pattern. Therefore, the inner electrode and the dummy electrode may have the same as that of the dielectric layer.

In addition, the groove portion formed on the top surface and the bottom surface of the ceramic green sheet laminate may be cut along the width direction of the bar-type laminate.

The distal edges in the width direction of the inner electrode and the distal edges in the width direction of the dummy electrode may be exposed to the cutting surfaces of the bar-type laminate 220. The cutting surfaces of the bar-type laminate may each be referred to as the first side and the second side of the bar-type laminate.

Figure 3E:
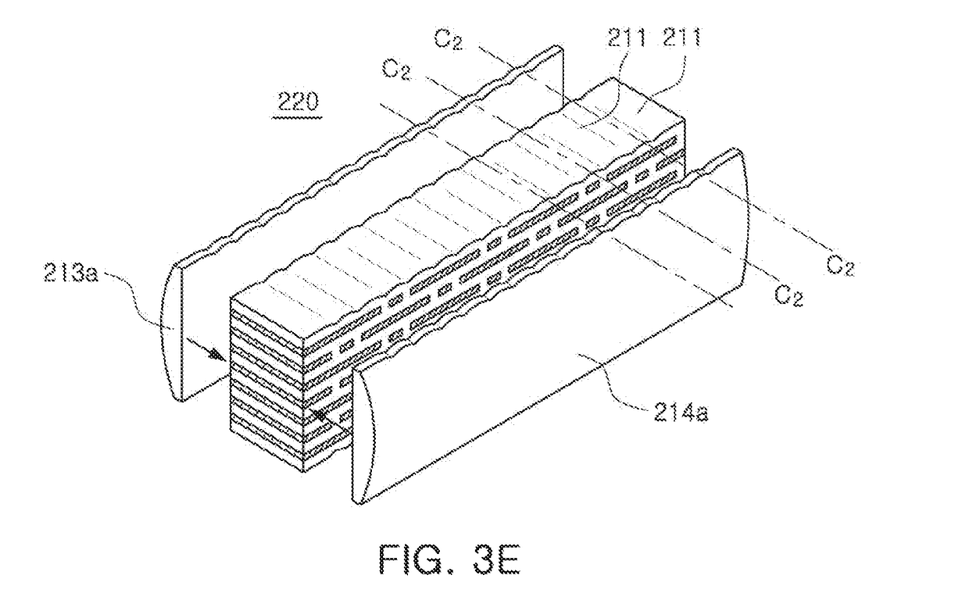

Next, as shown in FIG. 3E, the first side and second sides of the bar-type laminate 220 may each be provided with a first side portion 213a and a second side portion 214a. The first and second sides of the bar-type laminate 220 may be considered to correspond to the first side and the second side of the multilayer body 111 shown in FIG. 2B.

The first and second side portions 213a and 214a may be made of ceramic slurry including a ceramic powder in the bar-type laminate 220. The ceramic slurry may include a ceramic powder, an organic binder, and an organic solvent.

The amount of ceramic slurry may be controlled such that first and second side portions 213a and 214a have a desired thickness (or width).

The first and second side portions 213a and 214a may be formed by applying the ceramic slurry to the first and second sides of the bar-type laminate 220. A method of applying the ceramic slurry is not particularly limited and therefore, the ceramic slurry may be sprayed by a spray method or may be applied using a roller.

In addition, the first and second sides of the bar-type laminate may be dipped in the ceramic slurry to have the first and second side portions 213a and 214a formed thereon.

After the ceramic slurry is formed on the first and second sides, the groove portions may be formed in at least one of the top and bottom surfaces. The groove portion may be formed to have a pattern same as that of a groove portion formed in the bar-type laminate.

Figure 3F:
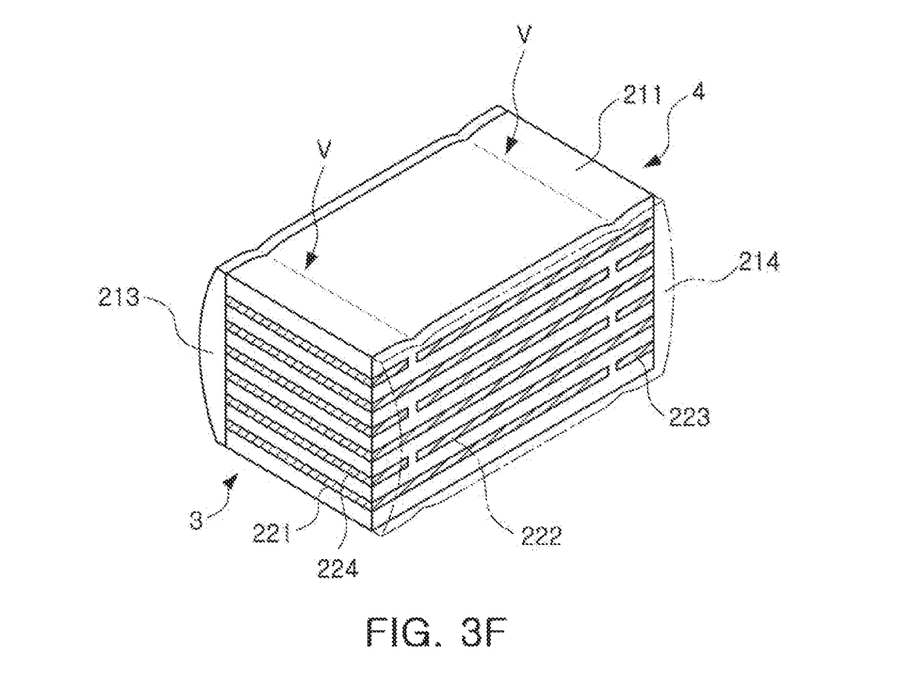

Next, as shown in FIGS. 3E and 3F, the bar-type laminate 220 provided with the first and second side portions 213a and 214a may be cut along cutting line C2-C2 to correspond to the individual chip size. FIG. 3C may be referenced to determine a position of cutting line C2-C2.

In the exemplary embodiment of the present invention, when the bar-type laminate is cut along cutting line C2-C2 to have the individual chip size, the groove portion may serve as the index.

As described above, in the exemplary embodiment of the present invention, two groove portions may be formed between the stripe-type inner electrode patterns, thereby improving cutting precision. In addition, comparing with the case in which one groove portion is formed, the case in which two groove portions are formed between the stripe-type inner electrode patterns may improve the position precision of the index, thereby reducing chip size distribution. That is, comparing with the case in which one groove portion is formed between the stripe type inner electrode patterns, the case in which two groove portions are formed may reduce the position distribution of the groove portions.

The bar-type laminate 220 is cut into chip sized fragments, thereby forming a multilayer body 211 having first and second side portions 213 and 214 formed thereon. FIG. 3F does not clearly illustrate the second side portion 214 and shows the contour thereof by a dotted line.

As the bar-type laminate 220 is cut along cutting line C2-C2, the overlapped central portion of the first inner electrode and the predetermined distance d2 formed between the second inner electrodes may be cut along the same cutting line, that is, line C2-C2. Alternatively, the central portion of the second inner electrode and a predetermined distance between the first inner electrodes may be cut along the same cutting line.

When the dummy electrode is formed, the central portion of the first inner electrode and the central portion of the second dummy electrode formed between the second inner electrodes that overlap with each other may be cut along the same cutting line. In other aspect, the central portion of the second inner electrode and the central portion of the first dummy electrode formed between the first inner electrodes may be cut along the same cutting line.

Therefore, one ends of the first inner electrode and the second inner electrode may be alternately exposed to the cutting surface along cutting line C2-C2. In addition, ends of the first and second dummy electrodes may be alternately exposed to the cutting surface along cutting line C2-C2.

The surface on which the first inner electrode 221 or the second dummy electrode 224 is exposed is considered as the third side 3 of the multilayer body shown in FIG. 2B and the surface on which the second inner electrode 222 or the first dummy electrode 223 is exposed may be considered as the fourth side 4 of the multilayer body shown in FIG. 2B.

As the bar-type laminate 220 is cut along cutting line C2-C2, the predetermined distance d2 between the stripe-type first inner electrode patterns 221a is cut half, whereby one end of the first inner electrode 221 may form the predetermined distance d2 from the fourth side. In addition, the second inner electrode 222 may form a predetermined distance from the third side.

According to an exemplary embodiment of the present invention, the first and second dummy electrodes may be respectively formed within the predetermined distances and one end of the first dummy electrode 223 may be exposed to the fourth side and one end of the second dummy electrode 224 may be exposed to the third side.

At least one of the top and bottom surfaces of the multilayer body may be provided with the groove portions V. In more detail, the area corresponding to the predetermined distance formed between the first inner electrode 221 and the first dummy electrode 223 is provided with the first groove portion and the area corresponding to the predetermined distance formed between the second inner electrode 222 and the second dummy electrode 224 may be provided with the second groove portion.

Thereafter, the multilayer body 211 in which the first and second side portions 213 and 214 are formed at both sides thereof may be plasticized and fired.

Next, the third side and the fourth side may each be provided with the outer electrodes to be connected to respective one ends of the first and second inner electrodes. The outer electrodes may be extended from the third side and the fourth side to the top surface or the bottom surface of the multilayer body to thereby cover the groove portions.

In addition, the first and second side portions may be plasticized and fired after being formed on both sides of the bar-type laminate and then the bar-type laminate may be cut into multilayer body shapes. Thereafter, a process of forming outer electrodes on the multilayer body may be performed.

According to the exemplary embodiment of the present invention, when the bar-type laminate 220 has the first and second side portions formed thereon and then is cut into chip sized fragments, a plurality of the multilayer bodies 111 may have the side portions formed thereon by one-time process.

In addition, although not shown, before forming the first side portion and the second side portion, the bar-type laminate may be cut into chip sized fragments to form the plurality of multilayer bodies.

That is, the bar-type laminate may be cut in such a manner that the central portion of the first inner electrode and the predetermined distance formed between the second inner electrodes that overlap with each other are cut along the same cutting line. Therefore, one ends of the first inner electrodes and the second inner electrodes may be alternately exposed to the cut surface.

Thereafter, the first and second sides of the multilayer body may have the first side portion and the second side portion formed thereon. The method of forming the first and second side portions will be described above. The multilayer body having the first side portion and the second side portion formed thereon may be plasticized and fired.

Thereafter, the third side of the multilayer body to which the first inner electrode is exposed and the fourth side of the multilayer body to which the second inner electrode is exposed may each have the outer electrodes formed thereon. The outer electrodes may be extended from the third side and the fourth side to the top surface or the bottom surface of the multilayer body to thereby cover the groove.

As set forth above, according to the exemplary embodiment of the present invention, at least one of the top surface and the bottom surface of the multilayer body may be provided with groove portions and outer electrodes may be provided to cover the groove portions.

Therefore, the contact area of the outer electrodes and the multilayer body is widened to improve the adhesive strength of the outer electrodes, thereby improving mechanical strength against external impacts.

According to the exemplary embodiment of the present invention, although the inner electrodes and the dielectric layer are thinly formed, the inner electrodes are entirely formed across the width of the dielectric layer to increase the overlapping area between the inner electrodes, thereby increasing the capacity of the multilayer ceramic capacitor.

In addition, the multilayer ceramic capacitor having excellent reliability while having the excellent capacity characteristics may be provided by reducing steps due to the inner electrodes within the multilayer ceramic capacitor so as to improve the lifespan of the insulation resistance.

Further, in the exemplary embodiment of the present invention, the thickness of the first and second side portions may be small, thereby relatively widening the overlapping area between the inner electrodes formed in the multilayer body. Further, the residual carbon may be easily removed by making the thickness of the first and second side portions small. Therefore, the concentration distribution of the residual carbon is small, thereby maintaining the fine structure and improving the connectivity of the inner electrodes.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing a multilayer ceramic capacitor, comprising:
    preparing a first ceramic green sheet on which a plurality of stripe-type first inner electrode patterns are formed to be spaced apart from one another by a predetermined distance and a second ceramic green sheet on which a plurality of stripe-type second inner electrode patterns are formed to be spaced apart from one another by a predetermined distance;
    forming a ceramic green sheet laminate by alternately stacking the first ceramic green sheet and the second ceramic green sheet in such a manner that a central portion of each of the stripe-type first inner electrode patterns and a predetermined distance between the stripe-type second inner electrode patterns overlap with each other;
    forming first and second groove portions on at least one of a top surface and a bottom surface of the ceramic green sheet laminate, wherein the first groove portions are formed at locations aligned, in a stacking direction of the ceramic green sheet laminate, with the predetermined distance formed between the stripe-type first inner electrode patterns formed on the first ceramic green sheet, and the second groove portions are formed at locations aligned, in the stacking direction of the ceramic green sheet laminate, with the predetermined distance formed between the stripe-type second inner electrode patterns formed on the second ceramic green sheet; and
    cutting the ceramic green sheet laminate.

2. The method of claim 1, wherein the forming of the groove portions is performed by pressing the ceramic green sheet laminate.

3. The method of claim 1, further comprising forming a first dummy electrode pattern within the predetermined distance formed between the stripe-type first inner electrode patterns or a second dummy electrode pattern within the predetermined distance formed between the stripe-type second inner electrode patterns.

4. The method of claim 3, wherein the first groove portions are formed on the top surface or the bottom surface of the ceramic green sheet laminate at a location aligned with an area where the first dummy electrode pattern is not present, and/or the second groove portions are formed on the top surface or the bottom surface of the ceramic green sheet laminate at a location aligned with an area where the second dummy electrode pattern is not present.

5. The method of claim 3, wherein a central portion of the stripe-type first inner electrode and the second dummy electrode formed between the second inner electrodes overlap each other.

6. The method of claim 1, wherein the first and second groove portions have a V-shape.

7. The method of claim 1, wherein the first groove portion comprises more than two groove portions formed on the top and bottom surfaces of the multilayer ceramic capacitor.

8. The method of claim 1, wherein the second groove portion comprises more than two groove portions formed on the top and bottom surfaces of the multilayer ceramic capacitor.

9. The method of claim 1, further comprising forming a first side portion and a second side portion having groove portions formed on at least one of a top or bottom surface of the first side portion and a second side portion at a location aligned with the first and second groove portions.

10. The method of claim 9, wherein the first and second side portions are made of ceramic slurry.

* * * * *